(12) United States Patent
Weiss et al.

(10) Patent No.: US 6,502,656 B2
(45) Date of Patent: Jan. 7, 2003

(54) UNIVERSALLY ADAPTABLE MOBILIZED STORAGE CONTAINER

(76) Inventors: John M. Weiss, 10 Brandywine Dr., Amherst, NY (US) 14221; Anita J. Weiss, 10 Brandywine Dr., Amherst, NY (US) 14221

( * ) Notice: Subject to any disclaimer, the term of this patent is extended or adjusted under 35 U.S.C. 154(b) by 0 days.

(21) Appl. No.: 09/808,594

(22) Filed: Mar. 14, 2001

(65) Prior Publication Data

US 2002/0017411 A1 Feb. 14, 2002

Related U.S. Application Data

(60) Provisional application No. 60/223,186, filed on Aug. 4, 2000, and provisional application No. 60/223,187, filed on Aug. 4, 2000.

(51) Int. Cl.[7] ................................................. B60K 1/00
(52) U.S. Cl. ..................... 180/168; 180/65.1; 180/208; 280/30
(58) Field of Search ................................. 180/168, 19.1, 180/19.2, 19.3, 208, 219, 908, 216, 65.1; 280/30, 37, 47.26, 643, 655, 43, DIG. 5; 446/430; 62/457, 457.7, 371; 301/111, 112

(56) References Cited

U.S. PATENT DOCUMENTS

| | | | | |
|---|---|---|---|---|
| 3,314,494 A | * | 4/1967 | Weitzner | ..................... 180/208 |
| 4,328,676 A | * | 5/1982 | Reed | ........................... 62/457 |
| 4,540,377 A | * | 9/1985 | Rehkamper et al. | ........ 446/430 |
| 4,550,930 A | | 11/1985 | Proffit | |
| 4,724,681 A | | 2/1988 | Bartholomew et al. | |
| 4,768,311 A | * | 9/1988 | Olson | ........................... 51/174 |
| 4,913,252 A | | 4/1990 | Bartley et al. | |
| 4,976,448 A | | 12/1990 | Wickersham et al. | |
| 5,097,922 A | * | 3/1992 | Stagi | ........................... 180/208 |
| 5,159,777 A | | 11/1992 | Gonzalez | |
| 5,180,023 A | * | 1/1993 | Reimers | ..................... 180/19.1 |
| 5,193,842 A | | 3/1993 | Fontenot | |
| 5,228,706 A | | 7/1993 | Boville | |
| 5,249,438 A | | 10/1993 | Rhaney et al. | |
| 5,259,215 A | | 11/1993 | Rocca | |
| 5,285,936 A | | 2/1994 | Matricardi, Jr. et al. | |
| 5,313,817 A | | 5/1994 | Meinders | |
| 5,316,096 A | * | 5/1994 | Good | ........................... 180/216 |
| 5,373,708 A | | 12/1994 | Dumoulin, Jr. | |
| 5,407,218 A | | 4/1995 | Jackson | |
| 5,423,195 A | | 6/1995 | Peters | |
| 5,603,555 A | * | 2/1997 | Dickey et al. | ............... 301/111 |
| 5,944,132 A | * | 8/1999 | Davies et al. | ................ 180/168 |

FOREIGN PATENT DOCUMENTS

| | | | | |
|---|---|---|---|---|
| WO | Wo 99/67122 | * | 12/1999 | .................. 180/168 |

* cited by examiner

*Primary Examiner*—Brian L. Johnson
*Assistant Examiner*—Hau Phan
(74) *Attorney, Agent, or Firm*—Dilworth & Barrese, LLP (57) ABSTRACT

A selectively configurable storage container for storing and transporting items through various environments includes a housing having at least one surrounding sidewall and a bottom which defines an enclosure. The storage container also includes a motor with at least one drive assembly. The drive assembly is selectively engagable with a first member, e.g., a wheel, and is configured to move the housing relative to a first terrain, e.g., a floor. The drive assembly is also interchangeable with at least one additional member configured to move the housing relative to a different terrain or environment, e.g., sand, water, grass, etc. A steering control cooperates with the drive assembly to navigate the housing through either the first or the different terrain.

19 Claims, 5 Drawing Sheets

UNIVERSALLY ADAPTABLE MOBILIZED STORAGE CONTAINER

CROSS REFERENCE TO RELATED APPLICATIONS

This application claims the benefits of and priority to U.S. Provisional Patent Application Serial No. 60/223,186 entitled "MOTORIZED MOBILE COOLER" filed on Aug. 4, 2000 by John M. Weiss and Provisional Patent Application Serial No. 60/223,187 entitled "MOTORIZED MOBILE LUGGAGE" filed on Aug. 4, 2000 by John M. Weiss and Anita J. Weiss, the entire contents of each of these applications is hereby incorporated by reference.

BACKGROUND

FIELD OF THE DISCLOSURE

The present disclosure relates to storage containers and more particularly, to a selectively configurable storage container for storing and transporting items, e.g., perishable consumer goods, refreshments, luggage and the like.

Historically, storage containers were used to simply store various items for later use. For example, a cooler kept perishable items cool or "fresh" for later consumption whereas a suitcase or luggage item kept items secure during transport to a different location. Typically, these types of storage containers (e.g., coolers, suitcases, etc.) were in the past carried and/or transported via the use of a handle(s) or a shoulder strap(s). Eventually, wheels were incorporated into the design thereby facilitating transport of the container along a particular surface (hard floor) but still requiring the user to either push, pull and/or manipulate the container during transport. However, movement of these known wheel-like containers along different and/or varying surfaces, e.g., sand, mud or grass, would require varying levels of added exertion.

For example it is known that even the best wheel-like design required some degree of user manipulation during transport, e.g., to navigate or steer the container across a given terrain. Again, the type of terrain, e.g., sand versus hard floor, greatly effects the degree of difficulty with this task. As a result, the user is forced to heed considerable attention to the storage container during transport which may effect other equally important activities which are commonplace with a typical trip to the beach or airport, e.g., minding small children, caring for an elderly person and/or manipulating other items such as golf clubs. Moreover, these concerns are exaggerated and remain particularly disadvantageous to the physically challenged.

In addition, carrying or wheeling a container through certain environments can be quite grueling even for a physically-fit user. For example, a cooler must typically be carried or dragged across the sand or grass to a spot of relaxation because the wheels (if any) function poorly in the sand or on the grass. Likewise, a suitcase is also carried or, ideally, wheeled from one terminal to another at a large airport across a hard surface and any wheel design is typically suited only for this particular type of terrain. Suitcases, again, must be dragged across other, rougher surfaces.

So far as is known, if a user wishes to negotiate a container such as luggage and/or a suitcase across a terrain and the wheels (if any) are not particularly suited for this type of terrain, the user is left with two (2) options: 1) drag and possible ruin the wheels and/or the container itself, or 2) carry the container across the terrain. As can be appreciated, both exercises require a large amount of exertion on the part of the user.

Thus, there exists a need for a new, simple, yet effective, container design which reduces the burdens and issues associated with transporting and handling the containers across any given terrain.

SUMMARY

The present disclosure relates to a selectively configurable storage container for storing and transporting items through various environments. The container includes a housing having a least one surrounding sidewall and a bottom defining an enclosure. The container also includes a motor having at least one drive assembly, the drive assembly being selectively engaged with a first member which is configured to move the housing relative to a first environment and being selectively interchangeable with at least one additional member configured to move the housing relative to a different environment. The container also includes a steering control which cooperates with the drive assembly for navigating the housing though either environment.

Preferably, the storage container includes a cover which substantially encloses the housing and at least a portion of the sidewall of the storage container. In one embodiment, the cover includes a compartment for storing an ice pack (or the like), a thermal unit and/or a temperature regulator. In another embodiment, the cover includes storage areas for stowing the additional members when not in use.

Advantageously, the motor, drive assembly and/or the steering control is waterproof and is remotely operable by a selectively connectable wire-like remote or a wireless remote control device. A handle may also be selectively engaged with the housing to control one or more of the motor, drive assembly and/or the steering control.

In another embodiment, the motor includes two drive assemblies and the steering control independently controls each of the drive assemblies to navigate the housing through a given environment. Preferably, at least one of the drive assemblies includes a drive axle having at least one interface which mechanically engages, e.g., snap-fit, a corresponding interface disposed on the first and additional members. Preferably, the first and additional members include items selected from the group consisting of: paddles, wheels, casters, tank-like treads and tires.

In yet another embodiment, the container includes at least one power source for supplying power to the motor, the drive assembly and/or the steering control. Preferably, the power source is rechargeable and includes at least one electrical interface for supplying power to additional electronic equipment.

In still yet another embodiment, the storage container includes a tracking mechanism which cooperates with the motor, the drive assembly and/or the steering control to move the housing relative to an electronic signal.

The present disclosure also relates to a method for selectively configuring a storage container for storing and transporting items through various environments. The method includes the steps of:

providing a selectively configurable storage container having a motor which includes at least one drive assembly configured to control a first member (e.g., a wheel) for moving the housing relative to a first environment and a steering control which cooperates with the drive assembly for navigating the housing through the environment;

selectively configuring at least one of the drive assemblies to control an additional member (e.g., a paddle) for moving the housing relative to a different environment (e.g., water); and navigating the housing through the different environment (e.g., water) using the steering control.

BRIEF DESCRIPTION OF THE DRAWINGS

Other objects and features of the present disclosure will become apparent from the following detailed description considered in connection with the accompanied drawings. It should be understood, however, that the drawings are designed for the purpose of illustration only and not as a definition of the limits of the present disclosure.

An illustrative embodiment of the subject universally adaptable mobilized storage container and method are described herein with reference to the drawings wherein.

DETAILED DESCRIPTION

Figure 1A:
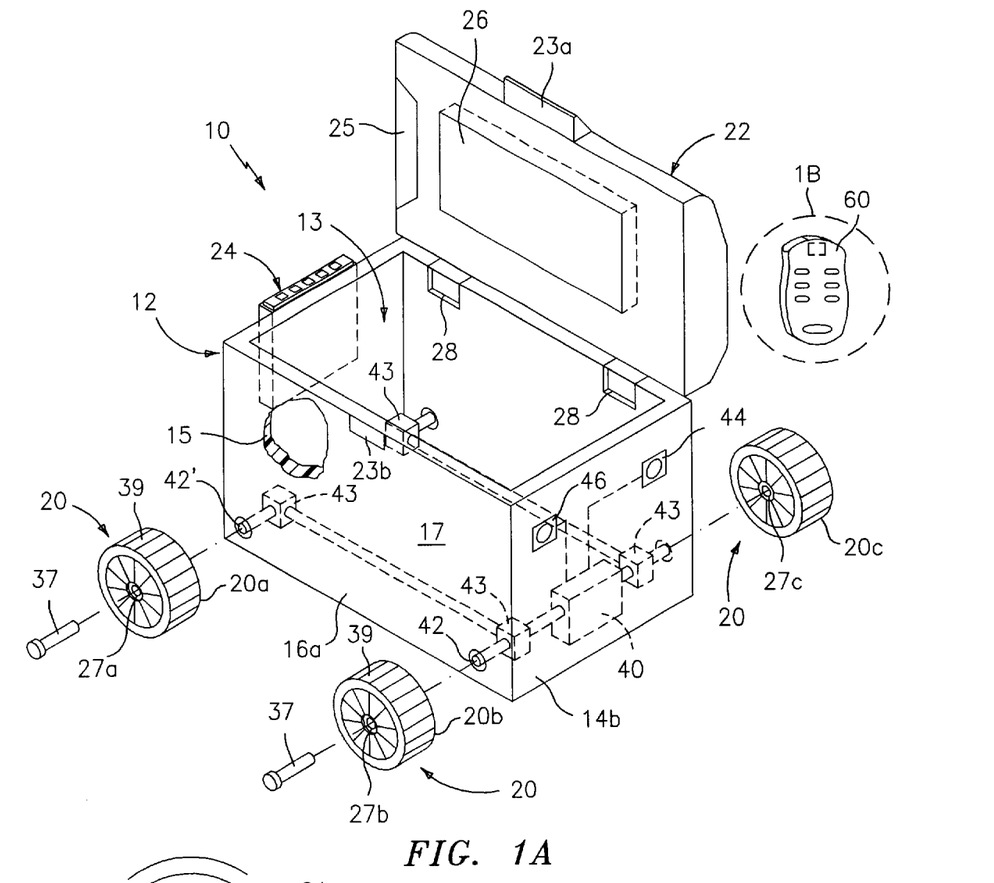
FIG. 1A is a perspective view of a storage container constructed in accordance with one embodiment of the present disclosure showing selective engagement of a pair of wheel members on a drive assembly of the storage container.

Referring now in detail to the drawing figures in which like reference numerals identify similar or identical elements, one embodiment of the present disclosure is illustrated generally in FIG. 1 and is designated therein a universally adaptable mobilized storage container 10. Although the various figure drawings show container 10 in one particular configuration, i.e., a cooler configuration, for the purposes herein the term "container" is defined to include, but should not necessarily be limited to, the following commercially named products: warmers, coolers, food containers, suitcases and luggage and/or trunks.

Figure 3:
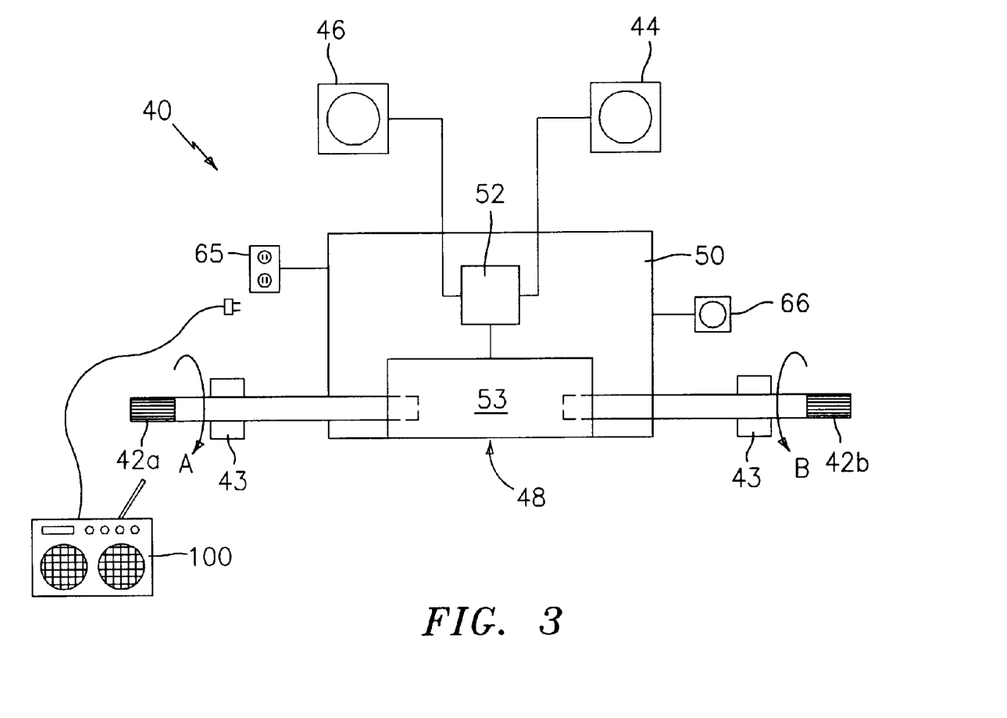
FIG. 3 is a schematic diagram showing one embodiment of a motor and drive assembly in accordance with FIG. 1.

As shown in the accompanying drawings, container 10 generally includes a housing 12, a cover 22, a motor 40, a steering control 46, a plurality of rotating members 20 and a drive assembly 48 (FIG. 3). Preferably, the container 10 is made from a durable material which has a relatively high degree of buoyancy, e.g., plastic, fiberglass, etc.

Figure 5A:
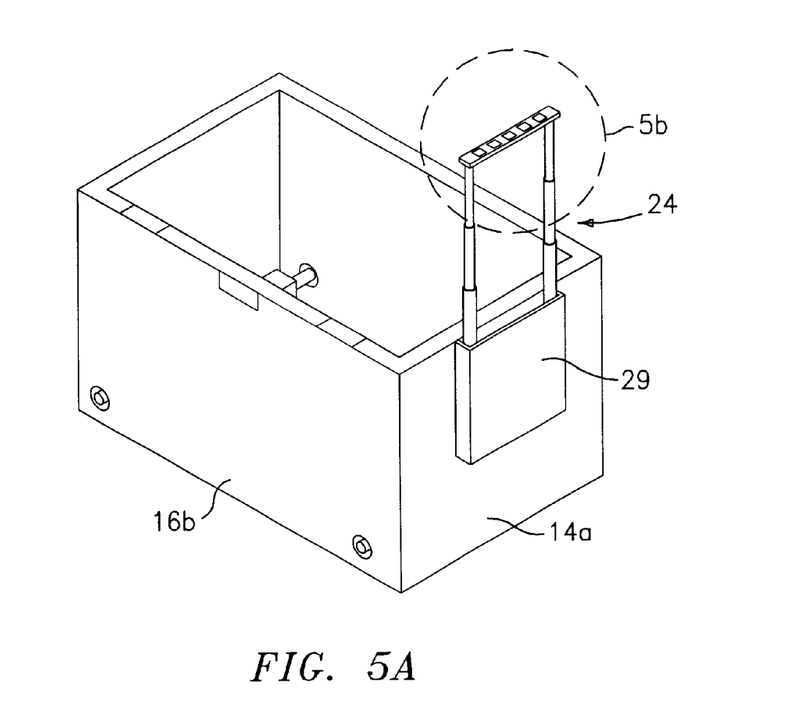
FIG. 5A is a reverse perspective view of the FIG. 1 embodiment showing a control handle in extended configuration.
Figure 5B:
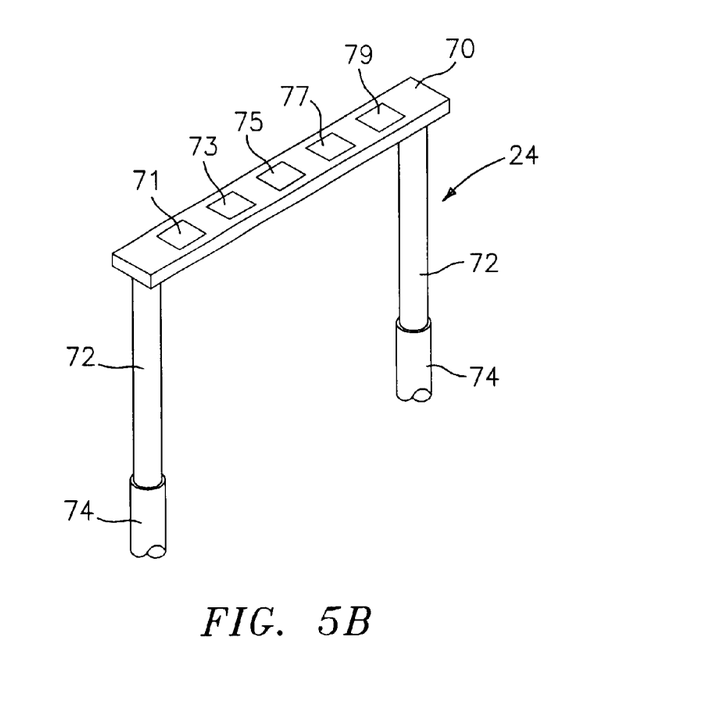
FIG. 5B is an enlarged, perspective view of the control handle of FIG. 5A.

As best shown in FIGS. 1A, 5A and 5B, housing 12 includes two pair of opposing sidewalls 14a, 14b and 16a, 16b, respectively, and a bottom 17 which, together, define an enclosure 13 for containing food items and/or various other articles. It is contemplated that container 10 may be dimensioned in any cylindrical or polygonal configuration defining an enclosure 13 therein for containing these items.

As mentioned above, container 10 also includes cover 22 which is dimensioned to engage housing 12 via hinge assemblies 28. As can be appreciated, cover 22 is designed to pivot about hinge 28 from a first open position which allows access to the internalized items within the container 10 to a closed position which substantially encloses housing 12 preventing access to the items contained therein. Cover 22 may also be equipped with one or more locks 23a which cooperate with a corresponding number of latches 23b disposed on the sidewalls 16a, 16b, 14a, 14b.

It is envisioned that cover 22 may be dimensioned to selectively engage and disengage housing 12 to suit a particular purpose. For example, cover 22 may be dimensioned to act as a removable tray and/or beverage holder with various pockets and/or sleeves contained therein for holding articles. Alternatively, cover 22 may be engaged with a temperature regulator 26 which can act as a cooling plate or hot plate for cooling or heating various food items. As can be appreciated, in this circumstance cover 22 would serve a dual purpose: 1) to thermally regulate the items contained within the housing 12 during storage and transport; and 2) to serve as a hot plate or cooling plate when cover is disposed in the open position. Cover 22 may also be configured as a storage compartment for the various wheel-like configurations as discussed in more detail below with respect to FIGS. 2A–2E.

Preferably, sidewalls 14a, 14b and 16a, 16b are made from an insulating material 15 which serves to maintain the housing 12 at a substantially consistent temperature during storage and transport. It is envisioned that a variety of different insulating materials may be used to accomplish this purpose, e.g., nylon and nylon-based insulating materials, polystryrene-based materials, polycarbonate-based materials, polyethylene-based materials, polyurethene-based materials, cellulose materials, foams, fiberglass-based materials, polyisocyanurate-based materials, plastics, rubber-based polymers and materials, rock wool, etc. Moreover, it is contemplated that cover 22 may also be manufactured from one of the above-referenced insulating materials.

As shown best in FIGS. 1A, 5A and 5B, the container 10 may also include a handle 24 which is preferably disposed within a handle housing 29 (FIG. 5A) which is selectively engageable with or integrally associated with a sidewall 14a, 14b, 16a, 16b. It is envisioned that handle 24 may be attached to the housing 12 for semi-manual manipulation of the container 10.

Turning now briefly to FIGS. 5A and 5B, handle 24 includes a U-like control panel 70 having a pair of downwardly extending rods 72 which are telescopically disposed within a corresponding pair of extension members 74. Preferably, rods 72 are positionable within extensions 74 from a first collapsed position to at least one extended position to permit facile, manual manipulation of the container 10 as needed.

Control panel 70 is preferably electrically interfaced (For example, via a wire) to either the motor 40, steering control 46 and/or the drive assembly 48 and includes a plurality of control switches 71, 73, 75, 77 and 79 which allow the operator to manipulate, drive and/or steer the container 10 across a given environment. A joystick or wheel (not shown) may also be incorporated on or integrally associated with the control panel 70 to facilitate steering and control of the container as needed. As can be appreciated and as compared to the remotely-controlled embodiment discussed below, the handle 24 and the combination handle 24/control panel 70 permit either manual and/or automated manipulation of the container 10 as desired. It is envisioned that the handle 24 and handle housing 29 may be selectively detached from the housing 12 for remote operation as discussed below.

Figure 1B:
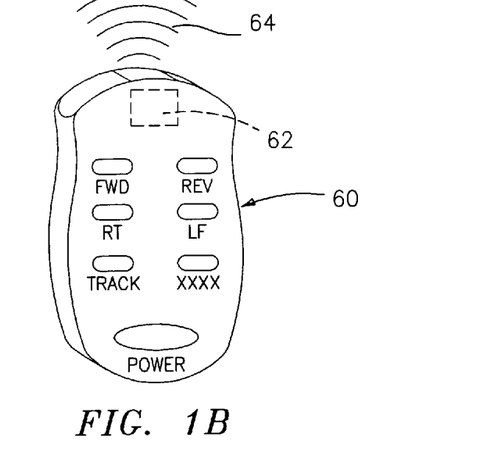
FIG. 1B is an enlarged view of a wireless remote used in connection with the storage container of FIG. 1.

Turning back to FIGS. 1A and 1B, as mentioned above, the motor 40, steering control 46 and/or the drive assembly 48 may also be remotely operated by an electronically interfaced remote (not shown) or a wireless remote 60. As best seen in FIG. 1B, remote 60 includes a control box 62 which emits an electronic signal 64 (radio frequency (RF), infrared, or the like) to control the power and movement of the container 10 across a given terrain, e.g., forward, reverse, speed and right and left turns. It is envisioned that the remote 60 (and/or the control panel 70 mentioned above with respect to FIG. 5B) may also control other operational features of the container 10, e.g., an electronic locking mechanism associated with the lock 23a and latch 23b, a password controlled security interface, an electronic gear shift mechanism (as described below with respect to the drive assembly 48), a tracking mechanism 44 (discussed below) and/or the temperature regulator 26. As mentioned above, the remote 60 may also include a joystick or wheel (not shown) to facilitate steering and control of the container as needed.

As shown best in FIGS. 1A, 2A–2E and 5A, container 10 also includes a plurality of different rotating members 20, 120, 220, 320, and 420 which are each selectively and interchangeably engageable with the drive assembly 48. More particularly and as initially described with respect to FIG. 1A wherein the rotating members comprise wheels 20a, 20b, 20c and 20d (FIG. 5A), each wheel, e.g., 20a, is preferably dimensioned to releasably and securely engage an end of a driven shaft 42' of the drive assembly 48. As can be appreciated, the wheel 20a to shaft 42' engagement may be accomplished by any known type of mechanical engagement, e.g., snap-fit, friction-fit, press-fit, pressure fit, etc. In some cases it may be preferable to utilize a locking pin or key 37 to securely engage the wheel 20a onto shaft 42'. Alternatively, an electronic interface or actuator (not shown) may be utilized to secure the wheel 20a to the shaft 42'.

Preferably, wheel 20a is generally circular and includes an outer gripping surface 39 and a hub 27a which is dimensioned to engage shaft 42' in a releasably secure manner. It is envisioned that rotation of shaft 42' will, in turn, rotate wheel 20a. It is contemplated that the shaft 42' to wheel 20a ratio is generally 1:1, however, the wheel 20a to shaft 42' engagement may be dimensioned to include other ratios depending upon a particular purpose. Preferably, hub 27a includes a plurality of gear-like teeth 31 (FIG. 2E) which facilitate secure, reduced-slip engagement with a corresponding plurality of gear-like teeth 47 (FIG. 2E) disposed on shaft 42'.

Figure 2A:
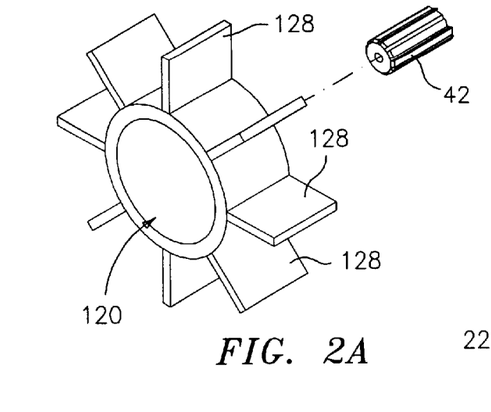
FIGS. 2A–2E are enlarged, perspective views of alternate embodiments of the interchangeable wheel members of FIG. 1.

As best shown in FIGS. 2A–2E, various types of rotating members may be releasably and selectively engaged with shaft 42, 42'. For example, FIG. 2A depicts a paddle-like rotating member 120 which includes at least one paddle 128 which extends from the outer periphery of the rotating member 120. It is envisioned that paddles 128 may be dimensioned having a myriad of different polygonal shapes and sizes depending upon a particular purpose or given a specific terrain. For example, the paddles 128 may be generally rectangular to negotiate the container 10 through water or swamp-like terrains and square-like to negotiate the container 10 through or across deep sand.

Figure 2B:
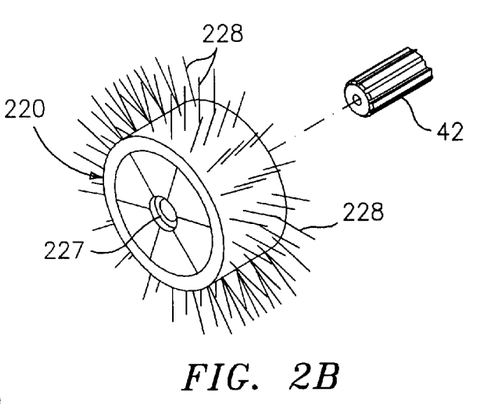

FIG. 2B shows another embodiment of the rotating member wherein the rotating member includes a spike-like tire 220. More particularly, tire 220 include a plurality of spikes 228 which project outwardly from the outer periphery thereof. A hub 227 is included to facilitate engagement of the tire with the shaft 42. It is envisioned that designing the tire 220 with spikes 228 will facilitate movement of the container 10 across slick surfaces, e.g., ice.

Figure 2C:
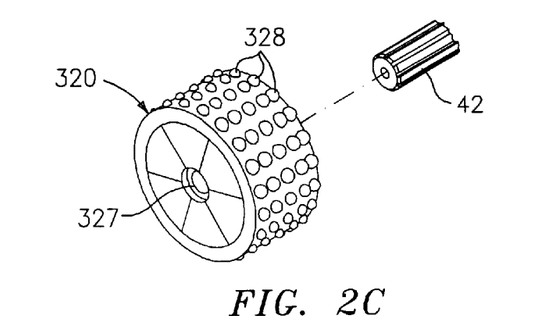

FIG. 2C shows another embodiment of the rotating member wherein the rotating member includes a knubbed tire 320. More particularly, the outer surface of the tire includes a plurality of knub-like gripping elements 328 which are designed to facilitate movement of the container 10 across hard surfaces, gravel, grass and/or sandy surfaces. Hub 327 may be included to facilitate engagement of the tire 320 with the shaft 42.

Figure 2D:
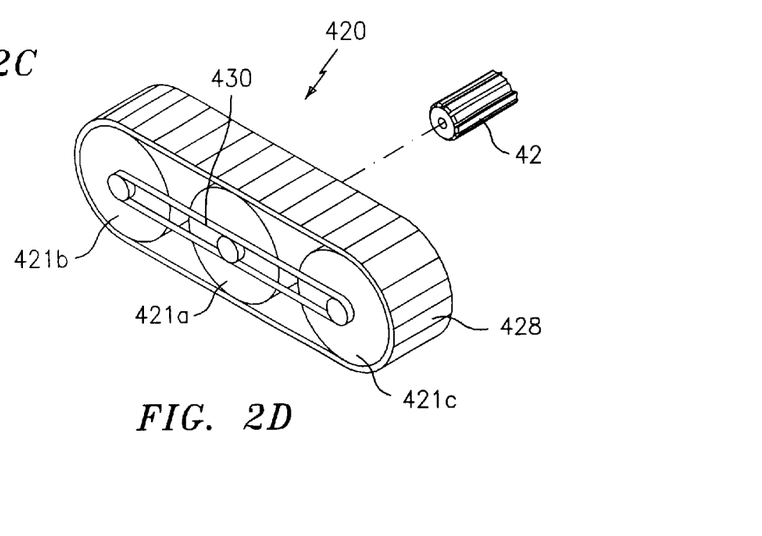

FIG. 2D shows yet another embodiment of the rotating member wherein the rotating member includes a tank-like tread assembly 420. More particularly, the assembly 420 includes a plurality of wheels 421b, 421c which are each inter-engaged, intermeshed and/or belt driven from a drive wheel 421a which is, in turn, affixed to shaft 42'. A tank-like tread 428 surrounds the outer periphery of the wheels 421a, 421b and 421c to enable the container 10 to travel across and negotiate rough terrain. In the embodiment shown in FIG. 2D, a belt 430 attaches the drive wheel 421a to the other wheels 421b, 421c so that all of the wheels 421a, 421b and 421c move generally in unison. Other rough track embodiments are also contemplated which include a plurality of small and large drive and carry wheels disposed at various locations along the tread assembly 420.

Figure 2E:
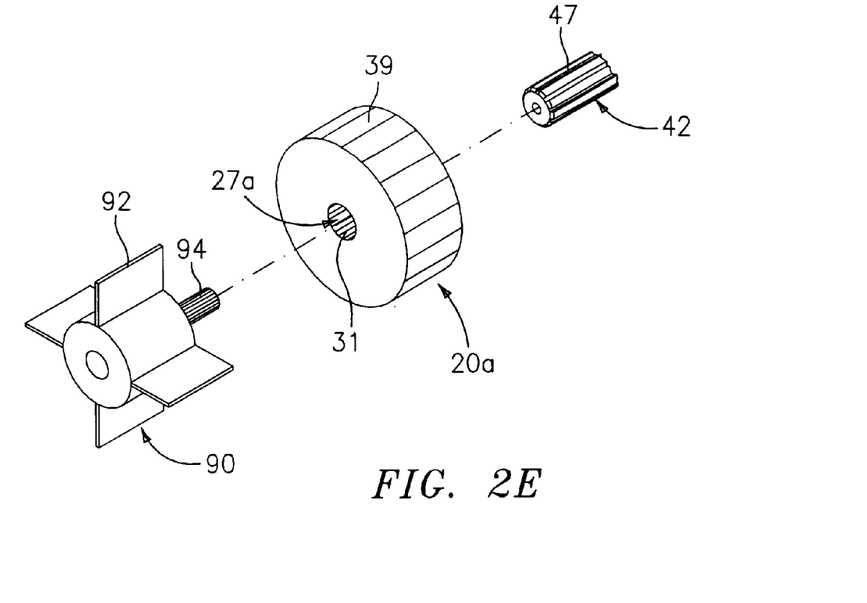

FIG. 2E discloses still yet another embodiment of the rotating member wherein the rotating member, e.g., wheel 20a with the hub 27a, selectively engages the shaft 42'. Preferably, wheel 20a also includes a grooved outer surface 39 which is designed for negotiating a given terrain as described above. In addition to engaging the shaft 42', the hub 27a is dimensioned to releasably and interchangeably engage an auxiliary rotating member or paddle 90 via shaft 94.

It is contemplated that incorporating this auxiliary rotating member 90, e.g., onto an existing first rotating member, e.g., wheel 20a, will enable the container 10 to traverse differing terrain without requiring a complete change in the type of rotating members (i.e., FIGS. 2A–2D) which are ideal for that specific terrain. For example, paddle 90 includes a plurality of propellers 92 disposed about the outer periphery thereof which operate in a similar manner as the paddles 128 described with respect to FIG. 2A, i.e., to enable the container 10 to propel itself through water. As can be appreciated from the present disclosure, since paddle 90 is releasably engaged to wheel 20a as shown in FIG. 2E, this embodiment of the container 10 is able to navigate through both water and land with acceptable efficiency.

In some cases it may also be advantageous to engage different rotating members on different shafts 42, 42' depending upon a particular purpose. For example, the tank tread assembly 420 of FIG. 2D may be engaged with one drive shaft 42 and the knubbed tire 320 of FIG. 2C may be engaged with another drive shaft 42' to allow the container 10 cross varying terrains. As can be appreciated, numerous combinations of the above rotating members may be envisioned depending upon a particular purpose.

In some cases it may be preferable to manufacture the housing 12 of the container 10 such that shaft 42 does not project beyond the housing 12. In turn, the hub 27a of the rotating member, e.g., 20a, would project outwardly therefrom to engage the corresponding shaft 42' within the housing 12. Alternatively, the rotating member 20a can be rotatingly mounted about a locking pin which engages both the hub 27a and the shaft 42' through the rotating member 20a. As can be appreciated, this design would be particularly suitable for airport travel since airlines do not encourage the use of trunks, suitcases or luggage which include protruding parts which can easily snag on conveying machines and/or other suitcases. As such, a cap (not shown) may be employed to cover the shaft 42' during airport handling and the like.

Figure 4:
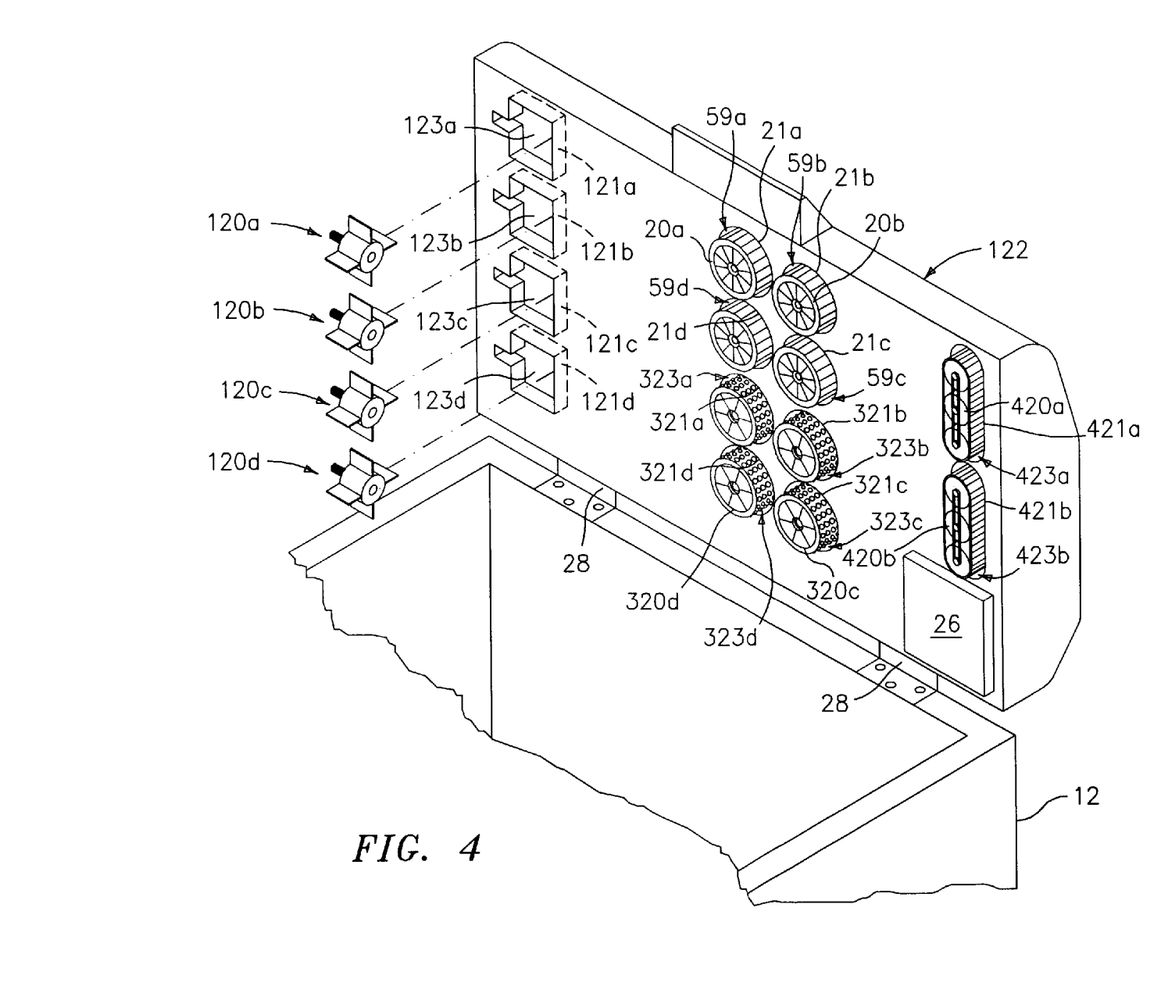
FIG. 4 is an enlarged, perspective view of one embodiment of a cover constructed in accordance with FIG. 1 showing storage areas for the interchangeable wheel members.

FIG. 4 shows another embodiment of the cover 22 which is designed to store the rotating members when not in use. More particularly, cover 22 is preferably dimensioned to include a variety of storage areas which are dimensioned to releasably and securely stow each of the unused rotating members during transport and storage. For example, cover 22 may include a first recess 121a which defines a first compartment 123a therein for storing and securing paddle 120a. Likewise, additional recesses, e.g., 121b–121d may be formed within cover 22 to store additional paddles, e.g., 120b–120d, respectively. It is contemplated that cover 22 may be dimensioned to include any number of recesses needed to store the unused rotating members during storage and transport, e.g., recesses 21a–21d form compartments 59a–59d for storing wheels 20a–20d; recesses 321a–321d form compartments 323a–323d for storing knubbed tires 320a–320d; and recesses 421a–421b form compartments 423a-423b for storing treads 420a and 420b. Similarly, spiked tires 220a–220d may be stored within cover 22 (not shown).

Moreover, it is envisioned that the cover 22, housing 12 and/or the sidewalls 14a, 14b, 16a, 16b of the housing 12 may include other compartments for storing, housing and/or supporting towels, Frisbees, umbrellas, drinks and/or various electronic equipment, e.g., radios, compact disc players, grills, lights, blenders, fans, etc. In one embodiment (not shown), it is contemplated that the container 10 includes a blender which is integrally associated with the inside of the cover 22 and is movable from an initial compact storage position to an operating position for blending drinks or other consumable items.

Turning now to the schematic diagram of FIG. 3 which shows the motor 40, the drive assembly 48 and steering control 46 which cooperate to navigate the container 10 across a given terrain. For the purposes herein, the motor 40 is used in a general sense and is defined to include and cooperate with one or more of the hereinafter described operating components as well as the internal working elements contained therein, e.g., the steering control, the drive assembly and the tracking assembly.

Preferably, motor 40 includes a drive assembly 48 having a gear box 53 (or the equivalent thereof) which controls the rotation of at least one drive shaft, e.g., 42a and/or 42b (FIG. 3). Other drive mechanisms and systems are also contemplated, e.g., belt assemblies, pneumatic systems, hydraulic systems, electrical drive systems, etc. It is also envisioned that gear box 53 may be dimensioned to include a variety of different gearing systems to control the rotation of a given shaft 42a, 42b depending upon a particular purpose, e.g., planetary gears, gear trains, differential gears, bevel gears, worm gears, transmissions, clutches, etc.

As best shown in FIG. 1, the drive shaft 42 may include or cooperate with a second gear box 43 (or the like) which transmits rotational power to an additional shaft 42' disposed along the same sidewall 16a of housing 12. In this case, it is envisioned that both shaft 42' and 42 rotate and drive wheels 20a and 20b, respectively, according to the same rotational speed or revolutions per minute (RPMs). In some case, however, it may be preferable to engage wheel 20a on an independent drive shaft 42' depending upon a particular purpose. As best shown in FIG. 3, it is also contemplated that the rotational speed (depicted by arrow "A") of one shaft, e.g., 42a, may be independently controlled relative to the rotational speed (depicted by arrow "B") of another shaft, e.g., 42b, for turning and steering purposes, i.e., rotating shaft 42a faster than 42b will turn the container to the left and vice versa.

Preferably the motor 40, drive assembly 48, steering control and/or tracking assembly 44 (described in more detail below) cooperate with a control box 52 to allow user control over one or more of these mechanisms via the control panel 70 disposed on the handle 24 or remotely via remote 60 (as described above). The control box may include a computer (not shown) which automates, regulates and/or improves (via a computer algorithm or program) the various hereindescribed functions of the container 10, e.g., steering, navigation and tracking.

In one embodiment, the motor includes a battery 50 which supplies power to the motor 40 and the operating components thereof. Preferably, the battery 50 is rechargeable and includes an electrical interface 66 (FIG. 3) for recharging the same 50. The battery 50 may also be solar powered, solar re-chargeable and/or partially solar powered. It is envisioned that the battery 50 may also provide power to an electrical outlet 65 which supplies auxiliary power to various other types of electronic equipment 100, e.g., radios, compact disc players, grills, lights, blenders, fans, etc.

As mentioned above, a tracking mechanism 44 may also be interfaced with the control box 52. It is envisioned that the tracking mechanism 44, when activated, follows or traces an electronic signal which is selectively, constantly, intermittently and/or randomly emitted from the remote 60 or another transmitter (not shown) which can be worn by a user or attached to a car, boat or the like. As can be appreciated, this feature is particularly advantageous because it allows "hands-free" and "mind-free" control over the movement of the container 10 without any manual interaction. It is contemplated that the tracking mechanism 44 (and/or the control box 52) may include additional security features such as low battery alerts, proximity alerts, theft alerts, password activation, etc. Again, it is contemplated that all of these features may be selectively controlled by the user via control panel 70 and/or remote 60.

In use, it is envisioned that the user will select the best rotating member for a particular terrain, e.g., paddle wheels 120, when transporting the container 10 in water and spiked tires 220 when transporting the container 10 across ice. Alternatively, when crossing sand, the user may choose to disengage one (or more) of the paddle wheels 120 from the shaft 42 and engage a knubbed tire 320 in lieu thereof. As can be appreciated, the general steering and tracking philosophies apply to each type of rotational member.

The present invention also discloses a method for selectively configuring a storage container for storing and transporting items through various environments. The method includes the steps of:

providing a selectively configurable storage container having a motor which includes at least one drive assembly configured to control a first member (e.g., a wheel) for moving the housing relative to a first environment and a steering control which cooperates with the drive assembly for navigating the housing through the environment;

selectively configuring at least one of the drive assemblies to control an additional member (e.g., a paddle) for moving the housing relative to a different environment (e.g., water); and navigating the housing through the different environment (e.g., water) using the steering control.

From the foregoing and with reference to the various figure drawings, those skilled in the art Will appreciate that certain modifications can also be made to the present disclosure without departing from the scope of the same. For example, belt-like systems, pneumatic systems, hydraulic systems (all not shown) may also be employed in lieu of or in combination with the gear box 53 to accomplish the same or similar purpose. It is also envisioned that the drive shaft 42, 42' may be designed to include one or more seals or gaskets to prevent water from entering the internal working components of the motor 40, drive assembly 48, steering control, control box, etc.

It is also contemplated that the container 10 may be manufactured from fire resistant materials and/or include manufacturing processes which incorporate or include the provision for adding other desirable qualities such protective coatings.

While several embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of preferred embodiments. Those skilled in the art will envision other modifications within the scope and spirit of the claims appended hereto.

What is claimed is:

1. A selectively configurable storage container for storing and transporting items through various environments, comprising:

a housing having a least one surrounding sidewall and a bottom defining an enclosure for containing items;

a motor mounted to said housing having at least one drive assembly having a drive shaft, said drive assembly being selectively engaged with a first rotating member which is configured to move the housing relative to a first environment, at least one additional rotating member being assembly being selectively interchangeable with said first rotating member, said at least one additional rotating member configured to move the housing relative to a different environment;

a steering control which cooperates with said drive assembly for navigating said housing through either environment; and a cover for said housing which includes recesses for storing and securing a plurality of unused rotating members.

2. A selectively configurable storage container according to claim 1 wherein at least one portion of said sidewall includes an insulating material.

3. A selectively configurable storage container according to claim 1 wherein said cover substantially encloses said housing.

4. A selectively configurable storage container according to claim 3 wherein said cover includes means for altering the temperature of said housing.

5. A selectively configurable storage container according to claim 4 wherein said altering means includes a thermal regulator.

6. A selectively configurable storage container according to claim 1 wherein said steering control is remotely operable.

7. A selectively configurable storage container according to claim 6 wherein at least one of said drive assemblies includes a drive axle having at least one interface which is mechanically engageable with a corresponding interface disposed on said first and said additional members.

8. A selectively configurable storage container according to claim 7 wherein said interfaces engage one another in a snap-fit manner.

9. A selectively configurable storage container according to claim 7 wherein said interface of said drive axle is recessed within said housing.

10. A selectively configurable storage container according to claim 7 wherein at least one of said motor, said drive assembly and said steering control is waterproof.

11. A selectively configurable storage container according to claim 1 wherein said motor includes two drive assemblies and said steering control includes means for independently controlling each of said drive assemblies to navigate said housing through either environment.

12. A selectively configurable storage container according to claim 1 wherein the rotating members include at least a tire having spikes, a tire having raised knobs, a tank-like tread assembly or an auxiliary paddle rotating member which is able to navigate both through water and over land.

13. A selectively configurable storage container according to claim 1 further comprising a handle which selectively engages said housing, said handle including means for controlling at least one of said motor, said drive assembly and said steering control.

14. A selectively configurable storage container according to claim 1 further comprising at least one power source for supplying power to at least one of said motor, said drive assembly and said steering control.

15. A selectively configurable storage container according to claim 14 wherein said power source includes at least one electrical interface for supplying power to at least one additional electronic device.

16. A selectively configurable storage container according to claim 14 wherein said power source is rechargeable.

17. A selectively configurable storage container according to claim 1 further comprising a tracking mechanism which cooperates with at least one of said motor, said drive assembly and said steering control to move said housing relative to an electronic signal.

18. A method for selectively configuring a storage container for storing and transporting items through various environments, the method comprising the steps of:

providing a selectively configurable storage container having; a motor having at least one drive assembly configured to control a first rotating member for moving said container relative to a first environment; a steering control which cooperates with said drive assembly for navigating said container through the first environment; and a cover which includes recesses for storing and securing a plurality of unused rotating members;

selectively configuring at least one of said drive assemblies to control an additional rotating member for moving said container relative to a different environment; and navigating the container through the different environment using said steering control.

19. A method according to claim 18 wherein the rotating members include at least a tire having spikes, a tire having knobs, a tank-like tread assembly or an auxiliary paddle rotating member which is able to navigate both through water and over land.

* * * * *